(12) United States Patent
Platonov et al.

(10) Patent No.: US 11,378,427 B2
(45) Date of Patent: Jul. 5, 2022

(54) METHOD OF SENSOR FUSION

(71) Applicant: Shhuna GmbH, Munich (DE)

(72) Inventors: Juri Platonov, Grünwald (DE); Pawel Kaczmarczyk, Kaufering (DE)

(73) Assignee: Shhuna GmbH, Munich (DE)

( * ) Notice: Subject to any disclaimer, the term of this patent is extended or adjusted under 35 U.S.C. 154(b) by 0 days.

(21) Appl. No.: 16/884,287

(22) Filed: May 27, 2020

(65) Prior Publication Data

US 2020/0378808 A1 Dec. 3, 2020

(30) Foreign Application Priority Data

May 27, 2019 (EP) .................................... 19176780

(51) Int. Cl.
*G01D 21/02* (2006.01)
*G01B 21/20* (2006.01)

(52) U.S. Cl.
CPC ............. *G01D 21/02* (2013.01); *G01B 21/20* (2013.01)

(58) Field of Classification Search
CPC ......... G01D 21/02; G01D 21/20; G01B 21/20
(Continued)

(56) References Cited

U.S. PATENT DOCUMENTS

2017/0301111 A1 10/2017 Zhao et al.
2018/0231385 A1 8/2018 Fourie et al.
(Continued)

OTHER PUBLICATIONS

Extended European Search Report for Application No. 19176780.5 dated Nov. 18, 2019, 7 pages.
(Continued)

*Primary Examiner* — John H Le
(74) *Attorney, Agent, or Firm* — Meunier Carlin & Curfman LLC

(57) ABSTRACT

A method of sensor fusion for systems including at least one sensor and at least one target object is provided. The method includes receiving configuration data at a processing device. The configuration data includes a description of a first system including one or more sensors and one or more target objects. The configuration data includes an indication that one or more geometric parameters and/or one or more sensor parameters of the first system are unknown. The method includes receiving an instruction at the processing device that the received configuration data is to be adjusted into adjusted configuration data. The adjusted configuration data includes a description of a second system including one or more sensors and one or more target objects, wherein the second system is different from the first system. The adjusted configuration data includes an indication that one or more geometric parameters and/or one or more sensor parameters of the second system are unknown. The method includes receiving, for each sensor of the second system, measurement data resulting from a plurality of measurements performed by the sensor. The method includes determining an optimization problem using the processing device, wherein each unknown geometric parameter and each unknown sensor parameter of the second system are associated with one or more variables of the optimization problem. The method includes determining a value of each unknown geometric parameter and a value of each unknown sensor parameter of the second system by solving the optimization problem using the processing device.

20 Claims, 6 Drawing Sheets

(58) Field of Classification Search
USPC .......................................................... 702/167
See application file for complete search history.

(56) References Cited

U.S. PATENT DOCUMENTS

| 2019/0113537 | A1  | 4/2019 | Zhou et al. |            |
|--------------|-----|--------|-------------|------------|
| 2020/0025931 | A1* | 1/2020 | Liang       | G01S 7/4817 |
| 2021/0041555 | A1* | 2/2021 | Zhong       | G01S 13/584 |

OTHER PUBLICATIONS

Collins, et al., "Algorithms for Cooperative Multisensor Surveillance", Proceedings of the IEEE, vol. 89, No. 10, Oct. 2001, pp. 1456-1477.

* cited by examiner

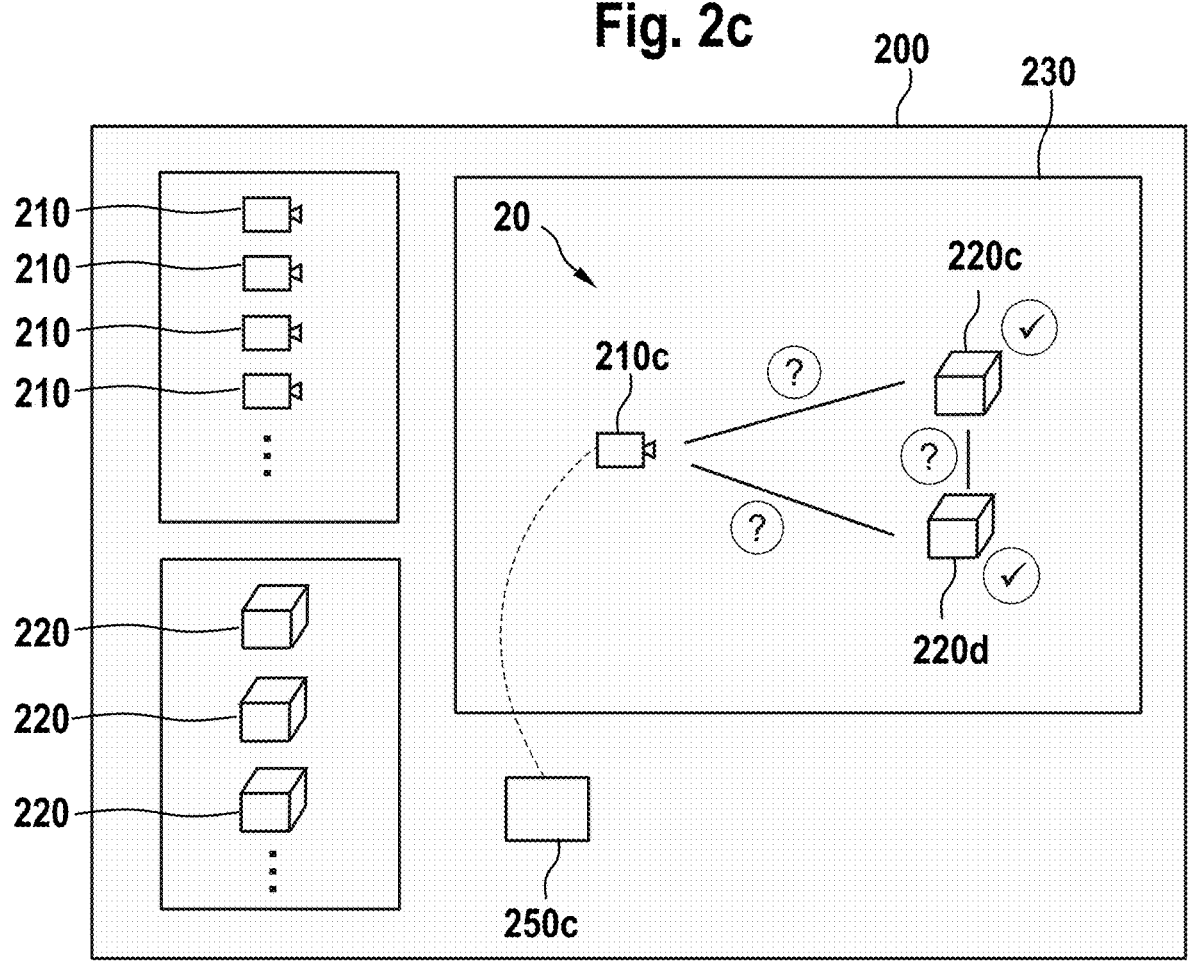

METHOD OF SENSOR FUSION

CROSS REFERENCE TO RELATED APPLICATION

This application claims priority to and benefit of European Patent Application 19176780.5 filed 27 May 2019, which is fully incorporated by reference and made a part hereof.

FIELD

Embodiments of the present disclosure relate to a method of sensor fusion for systems including at least one sensor and at least one target object. More specifically, embodiments described herein relate to a method for determining unknown parameters of a system by processing measurement data resulting from measurements performed by the sensors of the system.

BACKGROUND

In many applications, sensors are used to gather information about a system. Various types of sensors can be used, such as optical sensors (e.g. an optical camera), magnetic sensors, thermal sensors, movement sensors, accelerometers, distance sensors, and the like.

In many cases, a sensor performs multiple measurements of a system or object. For example, multiple measurements can be performed at regular time intervals over a certain period of time. In some cases, the sensor can be moving while the multiple measurements are performed, so that information can be gathered by the sensor from different locations. Further, it is often beneficial to provide a system with more than one sensor in order to collect information about the system. A plurality of sensors, each performing a plurality of measurements, can be provided.

Based on measured data provided by one or more sensors of a system, a user or operator may aim at determining properties of the system that were initially unknown to the user or operator. For example, cameras observing an object can be used to make a 3D-reconstruction of the surface of the object. If a large amount of measured data is available (e.g. a sequence of images taken from different distances and angles), it can be a complex task to process the measured data in order to determine the unknown properties.

Some methods for performing sensor fusion are known. These methods are tailored to certain specific settings, i.e., each sensor fusion application can treat a specific setting (e.g. a 3D reconstruction problem) but is not suitable for solving sensor fusion problems going beyond the specific type of systems for which the application is designed.

Accordingly, there is a need for improved methods of sensor fusion.

SUMMARY

According to an embodiment, a method of sensor fusion for systems including at least one sensor and at least one target object is provided. The method includes receiving configuration data at a processing device. The configuration data includes a description of a first system including one or more sensors and one or more target objects. The configuration data includes an indication that one or more geometric parameters and/or one or more sensor parameters of the first system are unknown. The method includes receiving an instruction at the processing device that the received configuration data is to be adjusted into adjusted configuration data. The adjusted configuration data includes a description of a second system including one or more sensors and one or more target objects. The adjusted configuration data includes an indication that one or more geometric parameters and/or one or more sensor parameters of the second system are unknown. The method includes receiving, for each sensor of the second system, measurement data resulting from a plurality of measurements performed by the sensor. The method includes determining an optimization problem using the processing device, wherein each unknown geometric parameter and each unknown sensor parameter of the second system are associated with one or more variables of the optimization problem. The method includes determining a value of each unknown geometric parameter and a value of each unknown sensor parameter of the second system by solving the optimization problem using the processing device.

According to a further embodiment, a data processing apparatus including a processing device is provided. The processing device is configured for receiving configuration data. The configuration data includes a description of a first system including one or more sensors and one or more target objects. The configuration data includes an indication that one or more geometric parameters and/or one or more sensor parameters of the first system are unknown. The processing device is configured for receiving an instruction that the received configuration data is to be adjusted into adjusted configuration data. The adjusted configuration data includes a description of a second system including one or more sensors and one or more target objects. The adjusted configuration data includes an indication that one or more geometric parameters and/or one or more sensor parameters of the second system are unknown. The processing device is configured for receiving, for each sensor of the second system, measurement data resulting from a plurality of measurements performed by the sensor. The processing device is configured for determining an optimization problem, wherein each unknown geometric parameter and each unknown sensor parameter of the second system are associated with one or more variables of the optimization problem. The processing device is configured for determining a value of each unknown geometric parameter and a value of each unknown sensor parameter of the second system by solving the optimization problem.

According to a further embodiment, a computer program is provided. The computer program includes instructions which, when the computer program is executed by a computer, cause the computer to provide a user interface. The user interface is configured for allowing a user to select a first set of items, the first set of items including one or more target objects and one or more sensors for a first system. The user interface is configured for allowing the user to indicate that one or more geometric parameters and/or one or more sensor parameters of the first system are unknown. The user interface is configured for allowing the user to adjust the selection of the first set of items such that the selected first set of items can be changed into a second set of items, the second set of items including one or more target objects and one or more sensors for a second system. The user interface is configured for allowing the user to indicate that one or more geometric parameters and/or one or more sensor parameters of the second system are unknown. If the each of the following conditions is fulfilled:

for each sensor of the second system, measurement data resulting from a plurality of measurements performed by the sensor is made available to the computer program, and the second set of items is selected via the user interface, and an indication that one or more geometric parameters and/or one or more sensor parameters of the second system are unknown is made via the user interface, then the user interface allows the user to issue an instruction that causes the computer to carry out the following:

determining an optimization problem, wherein each unknown geometric parameter and each unknown sensor parameter of the second system are associated with one or more variables of the optimization problem; and determining a value of each unknown geometric parameter and a value of each unknown sensor parameter of the second system by solving the optimization problem.

According to a further embodiment, a computer-readable data carrier is provided. The computer-readable data carrier has stored thereon the computer program according to embodiments as described herein.

Embodiments are also directed at apparatuses for carrying out the disclosed methods and include apparatus parts for performing each described method aspect. These method aspects may be performed by way of hardware components, a computer programmed by appropriate software, by any combination of the two or in any other manner. Furthermore, embodiments according to the disclosure are also directed at methods for operating the described apparatus. The methods for operating the described apparatus include method aspects for carrying out every function of the apparatus.

BRIEF DESCRIPTION OF THE DRAWINGS

So that the manner in which the above recited features of the present disclosure can be understood in detail, a more particular description of the disclosure, briefly summarized above, may be had by reference to embodiments. The accompanying drawings relate to embodiments of the disclosure and are described in the following:

FIGS. 2a-c show an illustrative example of a user interface of a computer program for solving sensor fusion problems according to embodiments described herein;

DETAILED DESCRIPTION OF EMBODIMENTS

Reference will now be made in detail to the various embodiments of the disclosure, one or more examples of which are illustrated in the figures. Within the following description of the drawings, the same reference numbers refer to same components. Generally, only the differences with respect to individual embodiments are described. Each example is provided by way of explanation of the disclosure and is not meant as a limitation of the disclosure. Further, features illustrated or described as part of one embodiment can be used on or in conjunction with other embodiments to yield yet a further embodiment. It is intended that the description includes such modifications and variations.

Embodiments described herein involve the notion of a system, e.g. the first system or the second system as described below. A system as described herein includes one or more sensors and one or more target objects. The one or more sensors and the one or more target objects of a system will sometimes be denoted as the "components" of the system, or the "system components".

Concrete examples of systems discussed herein are often relatively simple, i.e. these examples involve small systems including only few components. The discussion of such simple examples is for the sake of clarity of exposition and for facilitating an understanding of the present disclosure, and shall not be construed as a limitation of the scope. Particularly, systems of arbitrary size and complexity are covered by embodiments described herein.

Figure 1:
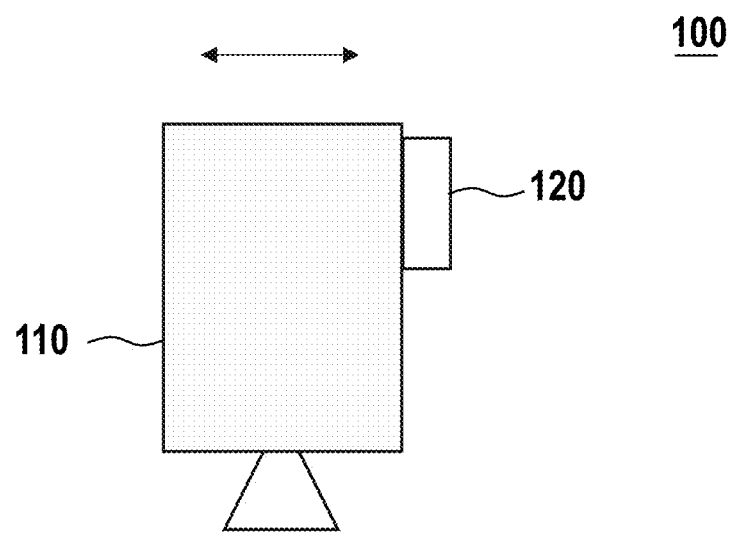
FIG. 1 shows an illustrative example of a system as described herein.
Figure 1:
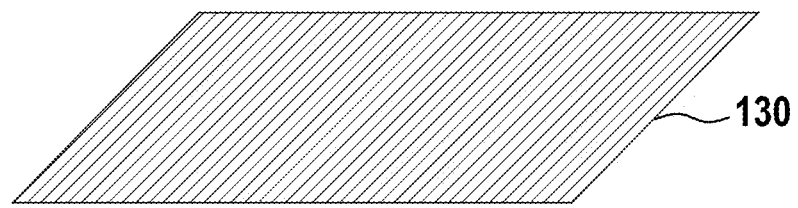

FIG. 1 shows an illustrative example of a system 100 as described herein. The system 100 includes a first sensor 110, a second sensor 120 and a target object 130. The target object 130 is a QR code. The first sensor 110 is an optical camera. The first sensor 110 makes images of the target object 130, e.g. at regular time intervals. The first sensor 110 may be movable, so that the first sensor 110 can take images of the target object 130 from different angles. By taking images of the target object 130, the first sensor 110 allows gathering information regarding the target object 130. The second sensor 120 is an inertial measurement unit (IMU) which is fixed to the first sensor 110 (e.g. using adhesive tape or glue). The second sensor 120 allows gathering information about the position and orientation (i.e. the pose) of the first sensor 110.

A sensor as described herein can be a sensor of various possible kinds, such as a camera (e.g. an optical camera or a thermal camera), a magnetic sensor, a gyroscope, an inertial measurement unit (IMU), a global positioning system (GPS), an accelerometer, and the like. A sensor as described herein can be any sensor which is suitable for gathering data relating to a position, spatial orientation, movement or shape of an entity. For some sensors, the entity about which data is gathered by the sensor can be an entity external to the sensor, such as a target object as described herein. Such a sensor can be referred to as an exteroceptive sensor. For example, a camera is a sensor which can be suitable for gathering data relating to, e.g., the position, movement or shape of an object observed by the camera. For other sensors, the entity about which the sensor gathers data can be the sensor itself, or a portion thereof. Particularly, the sensor can be configured for gathering information about an internal state of the sensor. Such a sensor can be referred to as an interoceptive sensor. For example, an IMU is a sensor which can be suitable for gathering data relating to the spatial orientation of the IMU itself. Alternatively, an IMU can be used to gather data relating to an object external to the IMU, e.g. by attaching the IMU to the object. A system as described herein can include a plurality of sensors, which may be sensors of different kinds. For example, a system can include both a camera and an IMU.

In the following, a camera will often be used as a concrete example of a sensor. This specific example is used for the sake of illustrating the concepts of the present disclosure and for facilitating an understanding thereof, and shall not be construed as limiting the scope.

A target object, as described herein, can be understood as an object which is observed by at least one sensor. A target object can be an object about which a user wishes to gather information by performing measurements of the target object using at least one sensor. For example, a target object can be a marker configured for visual pose estimation (e.g. a QR code), a magnetic field generator in a magnetic tracking system, or any object observed by e.g. a camera or scanned by a laser scanner.

A system as described herein may have one or more parameters. One kind of parameter is a parameter associated with a sensor of the system, referred to herein as a "sensor parameter". A further kind of parameter is a "geometric parameter". A geometric parameter can be a parameter associated with a target object of the system or a parameter associated with a spatial relationship between two components of the system. Sensor parameters and geometric parameters are described in more detail in the following.

A sensor may have one or more sensor parameters. A sensor parameter can be understood as a parameter, or property, which is intrinsic to the sensor, particularly a parameter which is substantially independent of an interaction between the sensor and its external environment. A sensor parameter may be referred to as an intrinsic sensor parameter. For example, a focal length, a principal point and a lens distortion are possible sensor parameters of a camera. As another example, a possible sensor parameter of a gyroscope can be a bias of the gyroscope.

One or more sensor parameters of a sensor can be unknown parameters. A purpose of a user may be to determine or estimate one or more unknown sensor parameters of a sensor. For example, a user may wish to calculate or estimate an unknown focal length of a camera.

A system as described herein may have one or more geometric parameters. A geometric parameter can be a parameter of a target object of the system.

A geometric parameter of a system may be a parameter relating to a shape of a target object, or of a portion thereof. An example of a geometric parameter relating to the shape of a target object is a surface parameter, i.e. a parameter describing the 3-dimensional shape of a surface of the target object (e.g. a 3D point cloud, a Bezier surface, a basis spline (B-spline) or a non-uniform rational basis spline (NURBS)). The surface may be an outer surface of the target object which is visible when the target object is observed by a camera.

A geometric parameter of a system may be a parameter relating to a movement of a sensor of the system. Examples of such geometric parameters are speed and acceleration of the sensor, e.g. speed and acceleration of a camera which is moving with respect to a target object.

A geometric parameter of a system may be a parameter relating to a position, spatial orientation and/or pose of a component of the system. A geometric parameter of a system may be a parameter describing a spatial relationship between two components of the system. The spatial relationship can be a spatial relationship between two target objects, between two sensors or between a target object and a sensor of the system. A geometric parameter may describe a relative position, relative orientation or relative pose of a first system component with respect to a second system component. A relative position of a first system component relative to a second system component may be understood as a translational position of the first system component with respect to the second system component, e.g. represented by a 3-dimensional translation vector. A relative orientation of a first system component relative to a second system component may be understood as an angular orientation of the first system component with respect to the second system component. A relative pose of two system components may be understood as a combination of a relative position and a relative orientation. A relative pose of two system components may correspond to, or be, a coordinate transform between the two respective coordinate systems of the two system components. A coordinate transform between a first coordinate system and a second coordinate system can be represented by a set of numerical values. The set of numerical values may include one or more numerical values representing a translation from the first coordinate system to the second coordinate system. For example, the set of numerical values may include three numerical values corresponding to a 3-dimensional translation vector from the origin of the first coordinate system to the origin of the second coordinate system. The set of numerical values may include one or more numerical values corresponding to a rotation from the first coordinate system to the second coordinate system. For example, the set of numerical values may include three numerical values corresponding to three rotation angles for rotating the first coordinate system into the origin of the second coordinate system.

Each geometric parameter of a system (e.g. the first system or the second system as described herein) may be a parameter associated with one of the following: a movement of a sensor of the system; a shape of a target object, or a portion thereof, of the system; and a spatial relationship between two target objects of the system, between two sensors of the system or between a sensor and a target object of the system. The spatial relationship may be a relative position, a relative orientation and/or a relative pose.

One or more geometric parameters of a system may be unknown parameters. A purpose of the user may be to determine, e.g. estimate, these unknown geometric parameters. For example, a system may include a QR code and a camera. The spatial orientation of the QR code (e.g. relative to a camera observing the QR code) is a geometric parameter of the system which may be unknown to a user. As another example, a system may include a first camera, a second camera and a QR code. The position and orientation of the QR code can be known, as well as the coordinate transform from (the coordinate system of) the first camera to (the coordinate system of) the second camera. A coordinate transform from the first camera to the QR code may be unknown to a user. The user may wish to calculate the latter unknown coordinate transform.

Embodiments described herein relate to a method of sensor fusion. The notion "sensor fusion" involves a system including one or more sensors and one or more target objects. The system has at least one unknown parameter, particularly an unknown sensor parameter and/or an unknown geometric parameter. According to embodiments described herein, the unknown parameter or parameters are determined by performing a sequence of measurements using the one or more sensors of the system and by suitably processing the measured data in order to determine the unknown parameter(s) from the measured data.

Particularly, the inventors have found that, regardless of the specific system which is analyzed and regardless of the specific geometric and/or sensor parameters which are to be determined, in each case the computation of the unknown parameters from the measured data can be mapped to an optimization problem. Each unknown parameter of the system corresponds to one or more respective variables of the optimization problem. In particular, the inventors have found that the computation of the unknown parameters can be mapped to an optimization problem irrespective of whether the unknown parameters are sensor parameters (e.g. focal length of a camera), geometric parameters associated with target objects (e.g. spatial orientation of a QR code) or geometric parameters associated with spatial relationship between two system components (e.g. relative position of a first camera with respect to a second camera). In each case, an optimization problem over one or more variables is constructed and solved in order to determine the unknown parameters.

When switching from a first setting (e.g. a first system having one or more first unknown geometric and/or sensor parameters) to a second setting (e.g. a second system having one or more second unknown geometric and/or sensor parameters), no new solution methods are needed. Instead, the form of the optimization problem is simply adjusted. For example, the adjusted optimization problem may have one or more new variables which were not present as variables of the initial optimization problem, or may have one or more new constraints that were not present in the initial optimization problem, and so on. In each case, a suitable optimization problem can be formulated. After the optimization problem has been formulated, the optimization problem can be solved by essentially the same solution techniques.

Accordingly, embodiments described herein allow performing sensor fusion for various different kinds of settings using a single unified method. In particular, irrespective of the specific type of sensor(s) involved—be it, for example, a camera, an IMU, or a magnetic sensor—and irrespective of the type of parameters which are to be computed—be it an unknown spatial orientation of a barcode or an unknown focal length of a camera—the same general solution method is applied. For example, the method described herein allows, on the one hand, solving simultaneous localization and mapping (SLAM) problems and, on the other hand, performing calibration of sensor parameters, within one and the same framework.

Further, embodiments described herein allow for an easy, real-time switching between different types of systems to be analyzed and between different types of parameters to be computed. For example, a user may first decide to solve a SLAM problem and, without effort, switch to a completely different type of problem, e.g. a sensor calibration problem, using the same framework. In particular, when implementing the method described herein as a computer program running on a processing device, the same program can be used to address sensor fusion problems of various different kinds, without the need for reprogramming the processing device or switching to different software each time when changing between various types of sensor fusion problems.

Further, embodiments described herein allow performing sensor fusion for systems of arbitrary sizes. In some implementations, a system as described herein can be small, e.g. a system including a single sensor and a single target object. In other implementations, a system can include a plurality of target objects and/or a plurality of sensors. A system can include 2 or more, 10 or more or 100 or more components, in some cases up to hundreds of thousands of components.

Figure 2A:
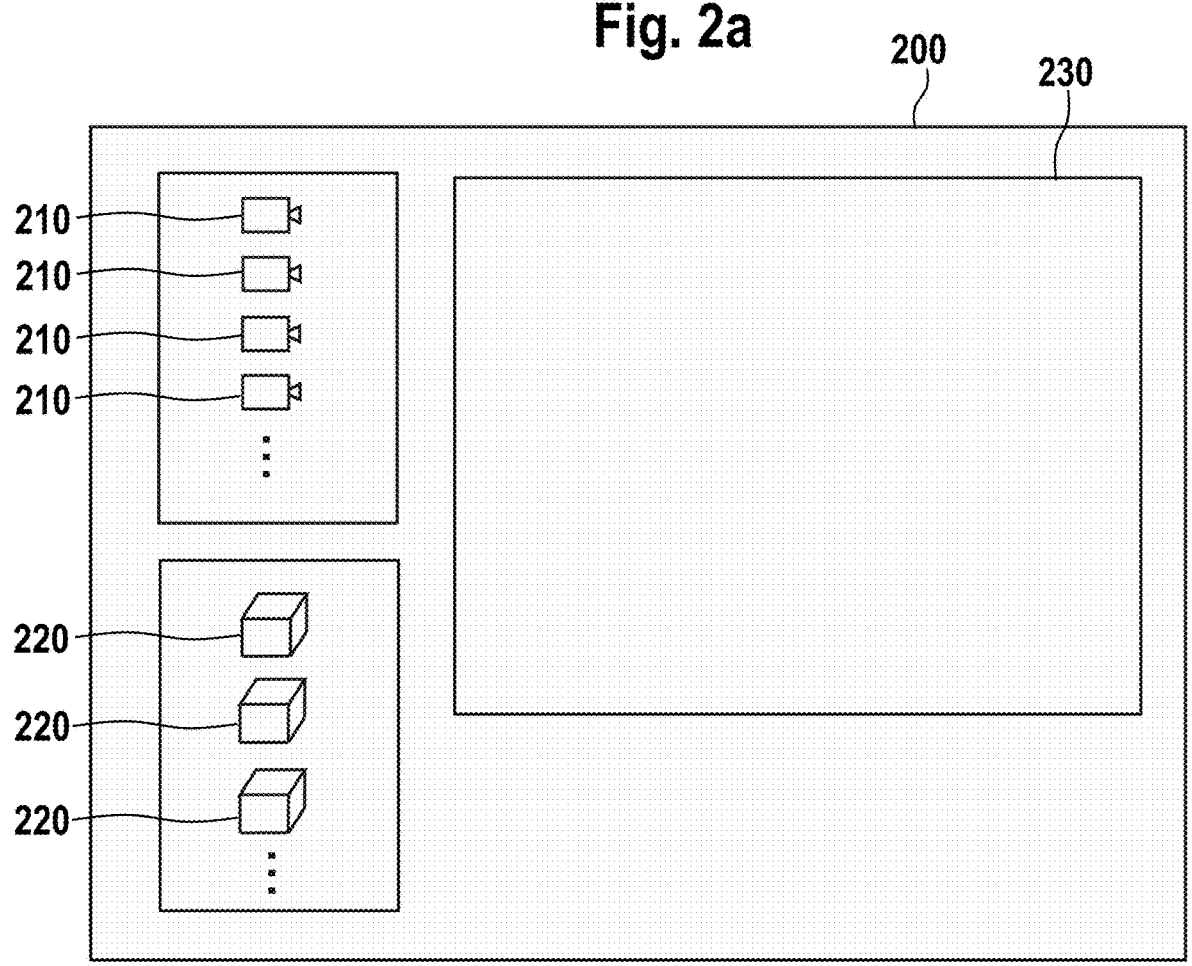

FIG. 2a shows an illustrative example of a user interface 200 of a computer program for performing sensor fusion according to embodiments described herein. The computer program is executed on a processing device as described herein. The user interface 200 displays a plurality of sensors 210 (depicted schematically as cameras for ease of presentation, but not being limited thereto) and a plurality of target objects 220. The user can select one or more target objects from the plurality of target objects 220 and one or more sensors from the plurality of sensors 210. The user interface 200 shown in FIG. 2a has a window 230 in which any selected target object(s) and sensor(s) can be displayed e.g. as icons.

Figure 2B:
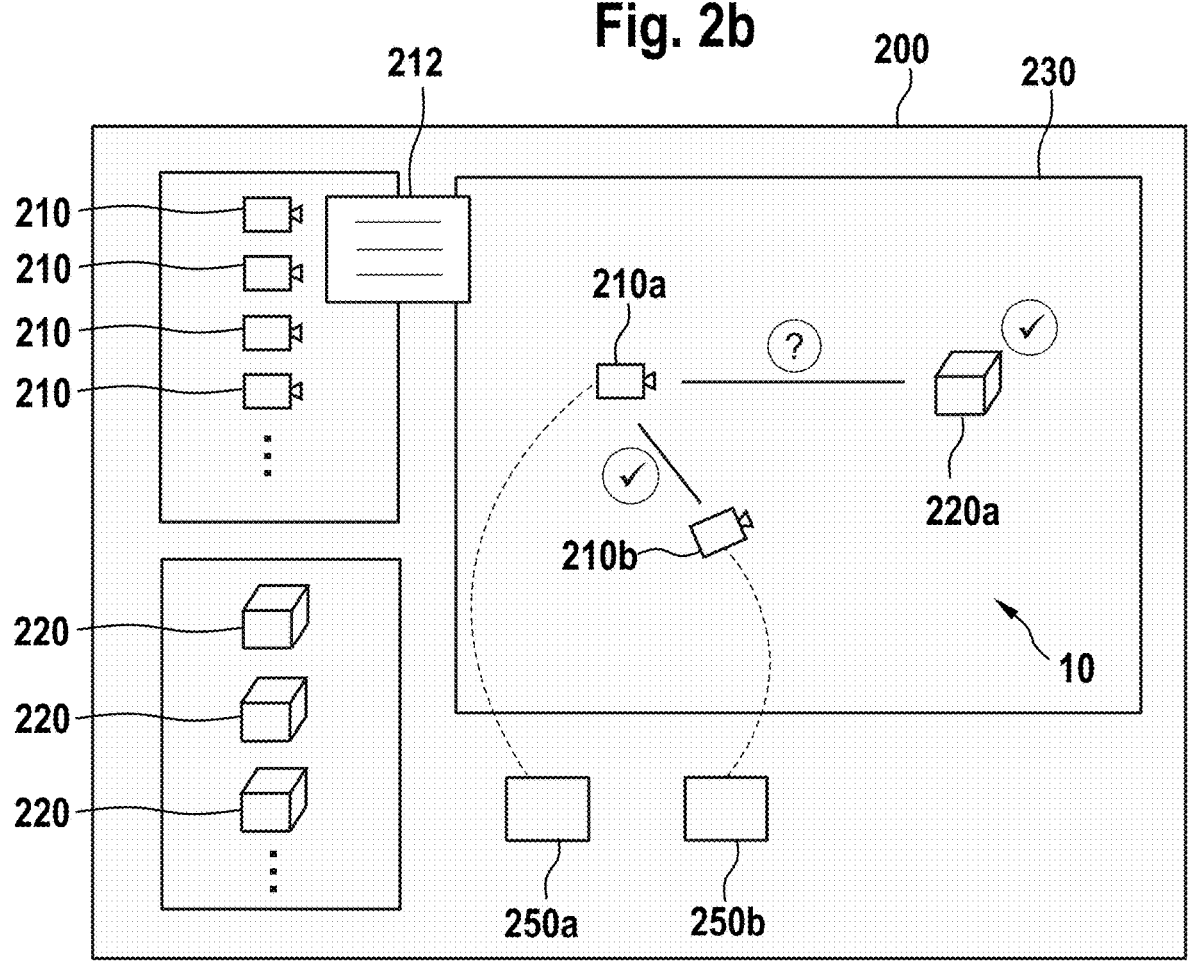

FIG. 2b shows the user interface 200 after the user has selected a target object 220a and two sensors 210a and 210b. The selected target object 220a and sensors 210a-b form a first system 10, which is displayed in the window 230. For example, the first system 10 shown in FIG. 2b can be the system 100 as shown in FIG. 1, wherein the sensor 210a, the sensor 210b and the target object 220a correspond to the first sensor 110 (camera), the second sensor 120 (IMU fixed to camera) and the target object 130 (QR code), respectively. The user interface 200 further displays a menu 212 showing a plurality of sensor parameters.

The user interface 200 shown in FIG. 2b allows the user to select one or more sensor parameters from the menu 212 for each sensor of the first system 10. Further, the user interface 200 allows the user to indicate whether one or more sensor parameters are known or unknown.

The user interface 200 shown in FIG. 2b allows the user to indicate whether one or more geometric parameters of the first system 10 are known or unknown, e.g. by providing a list of possible geometric parameters and/or by providing a graphical functionality to indicate whether a spatial relationship between two system components is known or unknown. In the example shown in FIG. 2b, the user has indicated with a question mark that the relative pose between sensor 210a and target object 220a is unknown. Further, the user has indicated with the symbol "✓" that the relative pose between the two sensors 210a and 210b is known. For example, if the first system 10 shown in FIG. 2b is the system 100 shown in FIG. 1, then the fact that the second sensor 120 (IMU) is fixed to the first sensor 110 (camera) can be indicated in the user interface 200 with the symbol "✓" showing that the relative pose between the two sensors 210a and 210b is known. Further, the shape of the target object 220a is also known, as indicated by a further "✓" symbol next to the target object 220a.

Measurement data resulting from measurements performed by each sensor of the first system 10 can be made available to the processing device (e.g. by connecting an USB stick containing the measurement data with the processing device, or by having sensors which deliver their measurement data in real time to the processing device). The user interface 200 can schematically display that the measurement data has been made available to the processing device. For example, in FIG. 2b, a box 250a and a box 250b are connected to the two sensors 210a and 210b, respectively, by dashed lines, indicating that the measurement data for these sensors has been made available to the processing device.

After the measurement data has been made available, an instruction can be issued, by a user (e.g. by clicking a suitable button or icon in the user interface 200) or automatically, that the unknown sensor parameters and the unknown geometric parameters of the first system 10 shall be computed by the processing device. According to embodiments described herein, the processing device determines an optimization problem associated with the first system, wherein each unknown geometric parameter and each unknown sensor parameter of the first system is associated with one or more variables of the optimization problem. The processing device then determines a value of each unknown geometric parameter and a value of each unknown sensor parameter of the first system by solving the optimization problem. Accordingly, the sensor fusion problem is solved.

As described above, embodiments described herein allow for solving sensor fusion problems of various kinds, since in each case the sensor fusion problem is mapped to an optimization problem.

For example, in the user interface 200, the user may add one or more system components to the first system 10, remove one or more system components from the first system 10, mark further sensor parameters or geometric parameters as being unknown, and so on. In other words, the user may adjust the first system 10 into a second system in order to solve a new sensor fusion problem.

FIG. 2c shows a second system 20 including a sensor 210c and two target objects 220c-d displayed in the window 230. As discussed above, in the user interface 200, the user can indicate whether the sensor 210c of the second system 20 has one or more known or unknown sensor parameters, and whether one or more geometric parameters of the second system 20 are known or unknown. In the present example, the relative poses of the sensor 210c with respect to each of the two target objects 220c and 220d of the second system 20, as well as the relative pose between the two target objects 220c and 220d, are unknown, indicated by question marks. Further, the shapes of the target objects 220c and 220d are also known, as indicated by further "✓" symbols. The relative pose of the target objects 220c and 220d can be a static relative pose, i.e. the position and orientation of the target component 220c relative to the target component 220d can be fixed. The relative poses of the sensor 210c with respect to each of the target objects 220c and 220d can be dynamic relative poses. For example, the sensor 220c can be a movable camera which is observing the target objects 220c and 220d while moving.

The user can then proceed in a manner similar to the operations performed for the first system 10. In particular, the user can make measurement data resulting from a plurality of measurements performed by the sensor 210c of the second system 20 available to the processing device, as indicated by box 250c being connected to the sensor 210c by the dashed lines. The user can then issue an instruction that the unknown sensor and geometric parameters of the second system 20 shall be computed by the processing device. In response thereto, the processing device determines a suitable optimization problem associated with the second system 20, wherein each unknown geometric parameter and each unknown sensor parameter of the second system 20 is associated with one or more variables of the optimization problem. The processing device then determines a value of each unknown geometric parameter and a value of each unknown sensor parameter of the second system by solving the optimization problem.

In light of the above, according to an embodiment, a method of sensor fusion for systems including at least one sensor and at least one target object is provided. The method includes receiving configuration data at a processing device. The configuration data includes a description of a first system, e.g. first system 10 shown in FIG. 2b. The first system includes one or more sensors and one or more target objects. The configuration data includes an indication that one or more geometric parameters and/or one or more sensor parameters of the first system are unknown. The method includes receiving an instruction at the processing device that the received configuration data is to be adjusted into adjusted configuration data. The adjusted configuration data includes a description of a second system, e.g. second system 20 shown in FIG. 2c. The second system includes one or more sensors and one or more target objects. The adjusted configuration data includes an indication that one or more geometric parameters and/or one or more sensor parameters of the second system are unknown. The method includes receiving, for each sensor of the second system, measurement data resulting from a plurality of measurements performed by the sensor. The method includes determining an optimization problem using the processing device, wherein each unknown geometric parameter and each unknown sensor parameter of the second system is associated with one or more variables of the optimization problem. The method includes determining, e.g. by the processing device, a value of each unknown geometric parameter and a value of each unknown sensor parameter of the second system by solving the optimization problem using the processing device.

A processing device as described herein may be a data processing device. A processing device may be a computer, e.g. a laptop, smartphone, and the like. A processing device may be a distributed processing device comprising a first processing unit (e.g. a first smartphone) and a second processing unit (e.g. a second smartphone) spaced apart from the first processing unit. The first processing device may be connected, e.g. via a wireless connection, to the second connection. One or more parts of the method described herein may be executed using the first processing unit. One or more further parts of the method may be executed using the second processing unit, e.g. in parallel with the one or more parts of the method being executed using the first processing unit.

A "description" of a system (e.g. the first system or the second system as described herein) may include data specifying the sensor(s) and target object(s) which are included in the system. For example, the description of a system may include data specifying that the system includes a first camera, a second camera, an IMU, a first target object and a second target object. In some implementations, a user interface as described herein may be used to provide the processing unit with a description of the system. For example, the user interface may show a plurality of icons representing possible sensors and target objects that can be selected by a user. A user may select the system components that are to be analyzed, e.g. by clicking on the corresponding icons, or by dragging these icons from a menu to a separate, designated window. The description of the system may include data representing the collection of all selected icons with their respective properties.

Embodiments described herein involve the notion of an indication that one or more geometric parameters and/or one or more sensor parameters of a system are unknown. For example, a user interface as described herein may allow a user to mark one or more geometric parameters and/or one or more sensor parameters of a system as being unknown parameters. By marking these parameters as unknown, and indication that the parameters are unknown may be made available to the processing device.

A parameter, e.g. a sensor parameter or a geometric parameter, which is unknown can be understood in the sense that a user may aim at calculating or estimating the value of the parameter. In some cases, the value of the parameter may be fully unknown to the user, i.e. no information about the value of the parameter is a priori available to the user. Accordingly, the user may want to compute or estimate the value of the parameter. In other cases, an unknown parameter may be a parameter such that some information about the value of the parameter is a priori known. For example, a crude, unsatisfactory approximation of the value of the parameter may be known to the user. The user may want to calculate the exact value of the parameter or estimate the value with a higher accuracy.

Configuration data associated with a system (e.g. the configuration data associated with the first system or the adjusted configuration data associated with the second system) may include an indication that one or more geometric parameters and/or one or more sensor parameters of the system are known. The configuration data may include one or more numerical values for each known geometric parameter or sensor parameter. The indication that the parameters are known, and the corresponding numerical values, may be made available to the processing device. The configuration data may include an indication of prior knowledge about the values of one or more unknown geometric and/or sensor parameters, optionally combined with a standard deviation.

For example, a user interface as described herein may allow a user to indicate that one or more geometric parameters and/or one or more sensor parameters of a system (e.g. the first system or the second system as described herein) are known parameters. The user interface may allow the user to input, for each known geometric parameter and sensor parameter, one or more numerical values for the parameters in question. For example, using the user interface, the user may indicate that a coordinate transform between two target objects of the system is known, and input six numerical parameters (three parameters associated with translation, three parameters associated with rotation) in the user interface.

The information that certain geometric parameters and/or sensor parameters are known (together with the corresponding numerical values) can be used, in combination with the measurement data from the sensor(s) of the system, to determine the unknown geometric and/or sensor parameters of the system. By supplementing the measurement data with the numerical values of known parameters, more information of the system is available for computing the unknown parameters, resulting in more accurate estimates of the unknown parameters and/or a decrease in the runtime.

The adjusted configuration data, as described herein, is different from the configuration data. The method as described herein may include adjusting the configuration data into the adjusted configuration data using the processing device.

The notion of "adjusting" the configuration data as considered in the present disclosure should be distinguished from a change of data which would arise when solving different sensor fusion problems using altogether different methods (e.g. different software packages). For example, a user could solve a first sensor fusion problem (e.g. a SLAM problem) using a first software package and thereafter solve a second sensor fusion problem (e.g. a calibration problem) using a second software package on the same processing device. Such an approach is different from the present disclosure and fails to provide the advantages thereof, namely that a variety of different sensor fusion problems can be solved within the same unified framework.

The adjustment of configuration data according to the present disclosure can be understood as a real-time adjustment. The configuration data may be adjusted into the adjusted configuration data within a same program environment or a same application of the processing device and/or without re-programming the processing device. The configuration data and the adjusted configuration data may be represented on the processing device as data having a same data type, data format or data template. For example, both the configuration data and the adjusted configuration data can be represented as text data according to a same text data template. The text data may allow for specifying, e.g., the components of a system and the geometric and sensor parameters of the system.

The adjusted configuration data associated with the second system is different from the configuration data associated with the first system. Several differences between the adjusted configuration data and the configuration data are possible.

The second system may be different from the first system. For example, the first system may include a first component (i.e. a first sensor or a first target object). The first component may not be included in the second system. The second system may include a second component (i.e. a second sensor or a second target object). The second component may not be included in the first system.

Additionally or alternatively, the indication that one or more geometric parameters and/or one or more sensor parameters of the second system are unknown may be different from the indication that one or more geometric parameters and/or one or more sensor parameters of the first system are unknown. For example, the configuration data may include an indication that a first parameter (i.e. a geometric parameter or a sensor parameter of the first system) is unknown. The adjusted configuration data may not include an indication that the first parameter is unknown. The adjusted configuration data may include an indication that a second parameter (i.e. a geometric parameter or a sensor parameter of the second system) is unknown. The configuration data may not include an indication that the second parameter is unknown. For example, the first system and the second system may include a same sensor, e.g. a camera. The configuration data relating to the first system may include an indication that a sensor parameter, e.g. a focal length, of the sensor is unknown. The adjusted configuration data relating to the second system may not include an indication that the sensor parameter is unknown.

In some implementations, the first system and the second system may be the same system. Each component of the first system may be included in the second system and vice versa. The adjusted configuration data may differ from the configuration data only in respect of the indication(s) of which sensor parameter(s) and/or geometric parameter(s) are unknown in respect of the second system and the first system, respectively.

A geometric parameter, as described herein, may have a parameter type. The parameter type indicates whether the geometric parameter is associated with (i) a position of a target object, (ii) a spatial orientation of a target object, (iii) a shape of a target object, (iv) a movement of a sensor, (v) a spatial relationship between two target objects, (vi) a spatial relationship between two sensors or (vii) a spatial relationship between a sensor and a target object. In other words, the parameter type allows for distinguishing between different kinds of geometric parameters.

The configuration data may include an indication that a first geometric parameter of the first system is unknown. The adjusted configuration data may include an indication that a second geometric parameter of the second system is unknown. The first geometric parameter may be different from the second geometric parameter. The first geometric parameter and the second geometric parameter may have different parameter types. For example, both the first system and the second system may include a same camera and a same QR code. The first geometric parameter may be a parameter (e.g. an angular coordinate) associated with a spatial orientation of the QR code. The second geometric parameter may be a parameter (e.g. translation along the X-axis) describing a relative pose of the camera with respect to the QR code. The parameter type of the first geometric parameter is different from the parameter type of the second geometric parameter.

The user may wish to compute a geometric parameter (e.g. a pose of a target object) of the first system and a sensor parameter (e.g. focal length of a camera) of the second system or, vice versa, compute a sensor parameter of the first system and a geometric parameter of the second system. The configuration data may include an indication that a geometric parameter of the first system is unknown and the adjusted configuration data may include an indication that a sensor parameter of the second system is unknown. Alternatively, the configuration data may include an indication that a sensor parameter of the first system is unknown and the adjusted configuration data may include an indication that a geometric parameter of the second system is unknown.

The configuration data and the instruction that the received configuration data is to be adjusted into adjusted configuration data may both be received from a same user interface. The user interface may be a user interface of a computer program being executed on the processing device. The user interface may allow a user to select one or more items. The selection can result in one or more instructions or data which are received by the processing device The user interface may be configured for allowing a user to select a first set of items, the first set of items including the one or more target objects and the one or more sensors for the first system. The user interface may be configured for allowing the user to adjust the selection of the first set of items such that the selected first set of items can be changed into a second set of items, the second set of items including the one or more target objects and the one or more sensors for the second system.

The user interface may be configured for allowing a user to indicate that one or more geometric parameters and/or one or more sensor parameters of the first system are unknown. The user interface may be configured for allowing a user to adjust the indication that the one or more geometric parameters and/or the one or more sensor parameters of the first system are unknown into an indication that one or more geometric parameters and/or one or more sensor parameters of the second system are unknown.

For example, as described above, the user interface may be a graphic user interface displaying a plurality of possible system components that can be selected (and unselected) by a user in order to compose various systems to be analyzed. The user interface may display a list of possible geometric parameters and/or sensor parameters that can be marked (and unmarked) as unknown by the user.

Thus, in contrast to an approach in which different types of sensor fusion problems are solved using different methods, embodiments described herein allow usage of a single user interface for solving a several different types of sensor fusion problems. This is due, in particular, that the underlying method for solving the sensor data problems is always the same, namely a mapping to an optimization problem, as described herein.

The method according to embodiments described herein includes receiving, for each sensor of the second system, measurement data resulting from a plurality of measurements performed by the sensor. The measurement data may be received at the processing device. Depending on the kind of sensor being used, the number of measurements performed by the sensor may be two or more, 100 or more, 1000 or more or even more measurements. For example, the number of measurements extracted out of a video frame can range from 1 to hundreds of thousands, depending on the image resolution.

The second system may include a first sensor and a second sensor. The method may include receiving first measurement data resulting from a first plurality of measurements performed by the first sensor. The method may include receiving second measurement data resulting from a second plurality of measurements performed by the second sensor.

After the measurements are performed by each sensor of the second system, the processing device may be provided with the measurement data resulting from said measurements. For example, the measurement data may be stored on a data storage device, e.g. an USB stick, CD-ROM, and the like. The processing device may read the measurement data from the data storage device. Alternatively, the measurement data may be sent, e.g. directly sent, from each sensor to the processing unit, e.g. via a wireless connection.

A spatial relationship between two components of a system (e.g. the first system or the second system as described herein) may be a static spatial relationship or a dynamic spatial relationship.

A static spatial relationship, or rigid spatial relationship, of two components can be understood in the sense that a relative position of the two components or a relative orientation of the two components, or both (i.e. a relative pose), remains fixed, e.g. in the period during which a sensor fusion problem for the system is analyzed. For example, an IMU glued to a camera (wherein the camera with the IMU glued thereto may be freely movable) is an example of a static spatial relationship.

If a static spatial relationship exists between a first component and a second component of a system, knowledge of a position and/or orientation of the first component together with knowledge of the static spatial relationship imply knowledge of the position and/or orientation of the second component. In other words, the position and/or orientation of the first component are not independent from the position and/or orientation of the second component.

The notion of a dynamic spatial relationship is used herein to distinguish from a static spatial relationship. A dynamic spatial relationship between two components can be understood in the sense that a relative position of the two components or the relative orientation of the two components, or both, can change over time, e.g. in the period during which a sensor fusion problem for the system is analyzed. For example, a camera which is moving relative to a target object is an example of a dynamic spatial relationship.

The adjusted configuration data, as described herein, may include an indication that a spatial relationship between two target objects of the second system, between two sensors of the second system or between a target object and sensor of the second system is a static spatial relationship. Alternatively, the adjusted configuration data may include an indication that a spatial relationship between two target objects of the second system, between two sensors of the second system or between a target object and sensor of the second system is a dynamic spatial relationship.

Embodiments described herein can make use of a temporal graph. A temporal graph can be associated with a system, e.g. the first system or the second system as described herein. A temporal graph provides a chronological representation of the spatial relationships between the components of the system in relation to the measurements performed by the sensors of the system over time. In particular, the edges of the temporal graph represent spatial relationships—which can be known or unknown—between the components of the system.

Before discussing the temporal graph in general below, first a concrete example is discussed with respect to FIGS. 3a-c for illustrating this concept and for facilitating an understanding thereof.

Figure 3A:
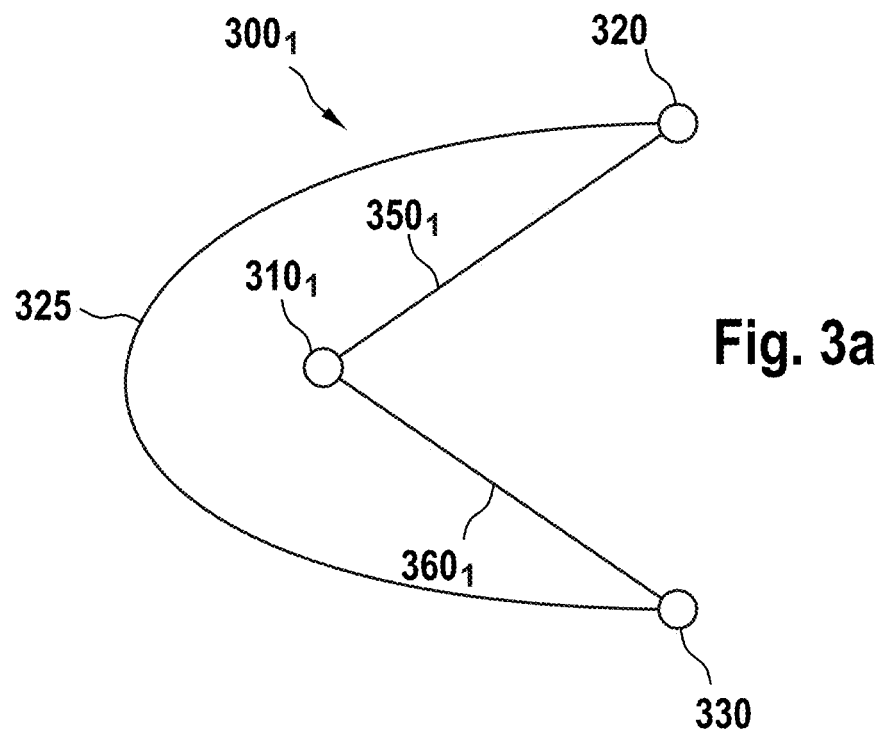
FIGS. 3a-c show an example of a construction of a temporal graph as described herein.
Figure 3B:
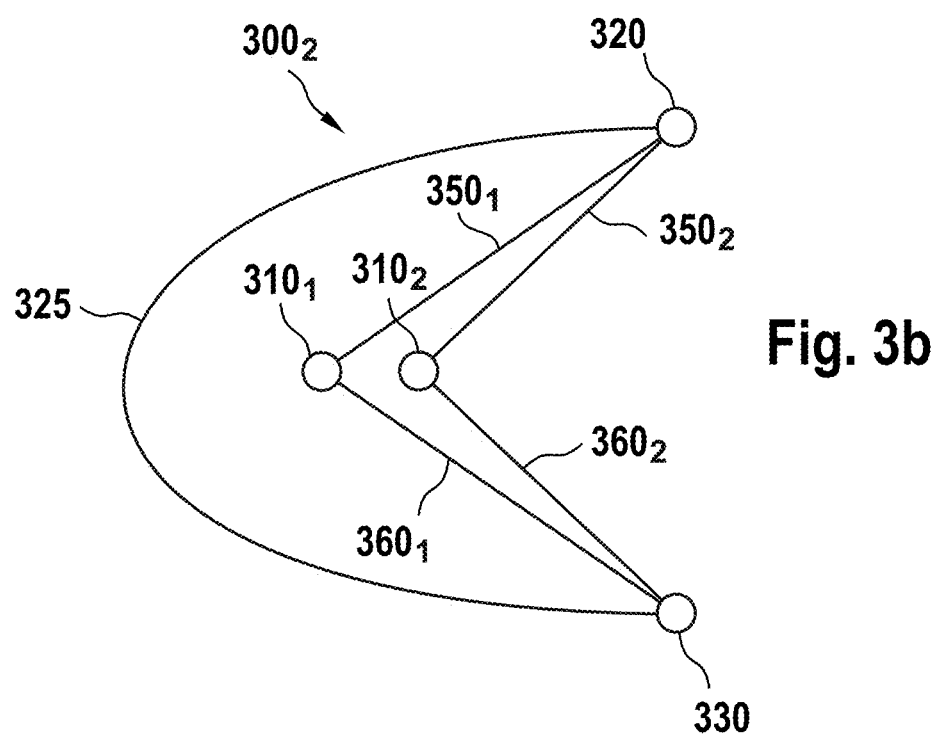
Figure 3C:
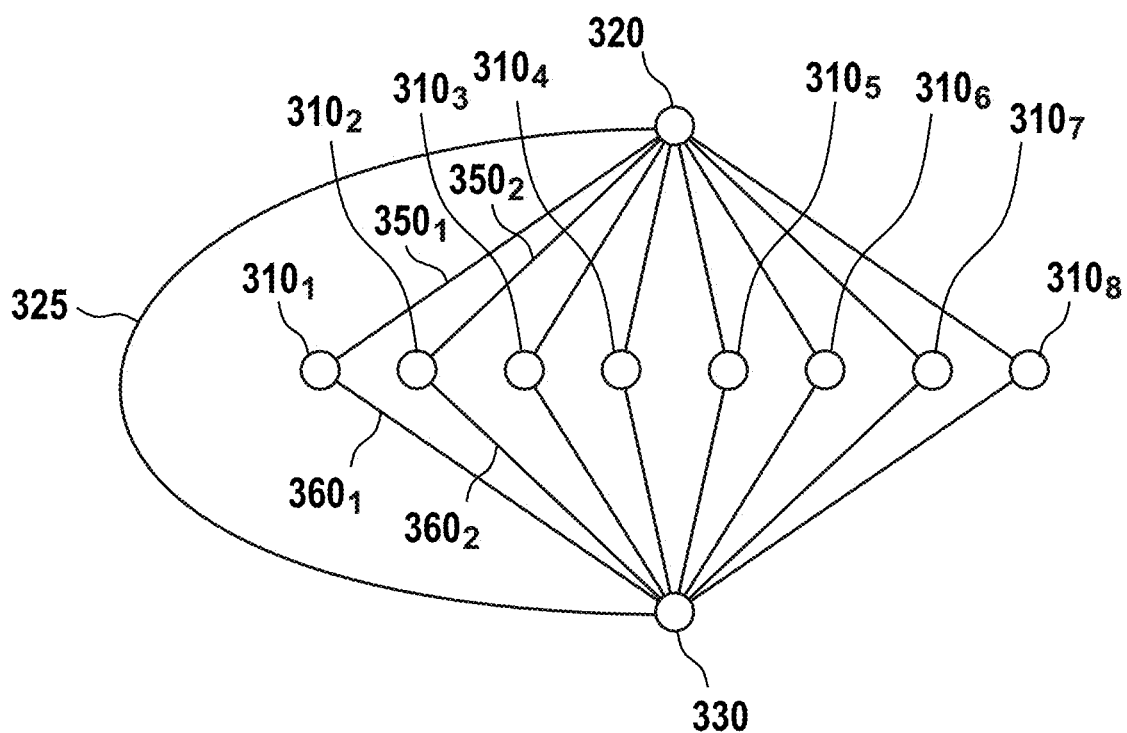

FIGS. 3a-c show a construction of a temporal graph in relation to the second system 20 discussed above with respect to in FIG. 2c. As discussed above, the second system 20 shown in FIG. 2c includes a sensor 210c and two target objects 220c and 220d. In the present illustrative example, it is considered that the sensor 210c of the second system 20 performs 8 measurements at respective times $t_1$, $t_2$, $t_3$, $t_4$, $t_5$, $t_6$, $t_7$ and $t_8$.

FIG. 3a shows a temporal graph $300_1$ representing a situation immediately after the first measurement has been performed by the sensor 210c at the time $t_1$. The temporal graph $300_1$ includes three nodes $310_1$, 320 and 330. The nodes 320 and 330 correspond to the target objects 220c and 220d, respectively, of the second system 20. The node $310_1$ corresponds to the sensor 210c at time $t_1$. The temporal graph $300_1$ includes three edges 325, $350_1$ and $360_1$. The edge 325 connects the nodes 320 and 330 with each other. The edge $350_1$ connects the nodes 320 and $310_1$ with each other, indicating that the relative pose of the target object 220c and the sensor 210c was measured at the time $t_1$. The edge $360_1$ connects the nodes 330 and $310_1$ with each other, indicating that the relative pose of the target object 220d and the sensor 210c was also measured at the time $t_1$.

FIG. 3b shows a temporal graph $300_2$ representing a situation immediately after the second measurement has been performed by the sensor 210c at time $t_2$. The temporal graph $300_2$ also includes the nodes $310_1$, 320 and 330 and the edges 325, $350_1$ and $360_1$ of the temporal graph $300_1$ shown in FIG. 3a. Further, the temporal graph $300_2$ includes a node $310_2$ corresponding to the sensor 210c at time $t_2$. Further, the temporal graph $300_2$ includes two edges $350_2$ and $360_2$. The edge $350_2$ connects the nodes 320 and $310_2$ with each other, indicating that the relative pose of the target object 220c and the sensor 210c was measured at the time $t_2$. The edge $360_2$ connects the nodes 330 and $310_2$ with each other, indicating that the relative pose of the target object 220d and the sensor 210c was also measured at the time $t_2$.

FIG. 3c shows a temporal graph $300_8$ representing a situation after all eight measurements have been performed by the sensor 210c. The temporal graph $300_8$ includes all nodes and edges of the temporal graph $300_2$ shown in FIG. 3b. In addition, the temporal graph $300_8$ includes nodes $310_3$ through $310_8$ corresponding to the sensor 210c at times $t_3$ through $t_8$, respectively. Further, the temporal graph $300_8$ includes edges between the node 320 and each of the nodes $310_3$ through $310_8$, indicating that the relative pose of the target object 220c and the sensor 210c was measured at each of the times $t_3$ through $t_8$. Further, the temporal graph $300_8$ includes edges between the node 330 and each of the nodes $310_3$ through $310_8$, indicating that the relative pose of the target object 220d and the sensor 210c was also measured at each of the times $t_3$ through $t_8$.

A possible procedure for constructing a temporal graph in general is provided in the following.

One or more groups of rigidly connected components of the system can be identified. Such groups are referred to as "rigs". A rig is a group consisting of one or more system components such that the spatial relationship, particularly a coordinate transform, between every two system components in the rig is a static spatial relationship. For example, if a system consists of three components A, B and C, such that the coordinate transform between A and B is static, and the coordinate transforms between A and C and between B and C are dynamic, then {A, B} and {C} are two rigs of the system. For example, if the relative pose of the target objects 220c and 220d shown in FIG. 2c is a static relative pose, then the target objects 220c and 220d (or equivalently, the nodes 320 and 330 representing these components in FIG. 3a) form a rig of the second system 20. If the sensor 210c is a moving sensor (e.g. a camera observing the target objects 220c and 220d while moving), then the only other rig of the second system 20 is the rig consisting of the sensor 210 as a single element.

That the spatial relationship between two components of a system is static can be apparent from the configuration data, i.e. if the configuration data includes an indication that the spatial relationship in question is static. Alternatively, that the spatial relationship is static can be a consequence of the fact that spatial relationships between other system components are static. For example, if A, B and C are three system components, the configuration data can include an indication that the coordinate transform between A and B is static and an indication that the coordinate transform between B and C is static. Accordingly, it follows that the coordinate transform between A and C is also static, even if this may not have been explicitly indicated in the configuration data.

One of the rigs of the system can be marked as being the "origin rig". The origin rig plays a different role in the construction of the temporal graph as compared to the other rigs, as discussed below. For example, for the second system 20 shown in FIG. 2c, the rig formed by the target objects 220c and 220d can be the origin rig.

The measurement data received by the processing unit can include a plurality of measurement results of measurements performed at different times by the sensors of the system. The temporal graph can be constructed iteratively by carrying out a sequence of operations in response to each measurement result received by the processing device.

In response to receiving a result of a measurement performed by a sensor S at a time t, a node corresponding to the sensor S is added to the temporal graph (for example, in FIG. 3a, node $310_1$ is included in the temporal graph $300_1$ after a measurement has been performed by the sensor 210c at time $t_1$). The node can have a timestamp indicating the time t of the measurement. If the sensor S belongs to a rig R and if there are other components in the rig R, nodes corresponding to each of the components in the rig R are also included in the temporal graph. Each node can receive a measurement timestamp. The static spatial relationships between the components of the rig R are represented as edges between the corresponding nodes of the temporal graph. Such edges can be referred to as "static edges".

The process of adding nodes and edges associated to a rig in order to account for a measurement performed by a sensor of the rig at a given time is referred to herein as "instantiating" the rig. The collection of nodes and edges included in the temporal graph in an instantiation procedure is called an "instance" of the rig at time t, wherein t is the time of the measurement.

The sensor S performing the measurement can be an exteroceptive sensor, that is, the sensor S observes a target object T external to the sensor S. In such case, also the rig R' to which the target object T belongs is instantiated in the temporal graph. This instantiation results in further nodes and edges (i.e. static edges) being added to the temporal graph according to the instantiation process described above (for example, in relation to FIG. 3a, since the sensor 210c performs a measurement of, e.g., target object 220c at time $t_1$, the rig of target object 220c (which is the origin rig) is instantiated; accordingly, the nodes 320 and 330 and the edge 325 are added to the temporal graph). Further, an edge (referred to as a "dynamic edge") between the node corresponding to the sensor S and the node corresponding to the target object T is included in the temporal graph (for example, in FIG. 3*a*, the edge 350$_1$ is added).

If the rig R or the rig R' is the origin rig, then the rig in question is instantiated only once (for example, with respect to FIG. 3*a*, the sensor 210*c* observes both target objects 220*c* and 220*d* but, since these two target objects form the origin rig, this rig is instantiated only once). Further, if an instance of a rig at a time t already exists, because the rig was already instantiated in response to a measurement performed by another sensor of the rig at the same time t (within a tolerance range that can be configurable), the existing instance of the rig is reused, i.e. the instantiation for time t is not performed a second time.

The sensor S may be an interoceptive sensor, that is, a sensor measuring its own internal state (e.g. velocity) and not observing a target object external to the sensor. In such case, one or more edges are included in the temporal graph to connect the instance of the rig R at time t with one or more instances of the same rig R at earlier or later times, if the latter exist. The node corresponding to the sensor S at time t is connected by an edge to the node(s) corresponding to the same sensor S at the earlier or later times. For example, edges can be drawn between instances that are no more than a time difference T apart, i.e. all instances for times belonging to the interval [t−T, t+T]. Therein, T can be a threshold time difference, which can be configurable. The time difference between two nodes of the temporal graph can be determined based on the timestamps of the nodes. The value of the threshold T affects how many edges are included in the temporal graph and can be selected, e.g., based on available memory space or desired speed of the computation. The value of T can also depend on the sensor fusion problem which is to be solved. The sensor fusion problem at hand can determine which specific value(s) of T will allow to obtain a good approximation of the unknown parameters of the system.

Further, if S is an interoceptice sensor, each node corresponding to S can have a label including kinematic motion properties of the sensor S (e.g. velocity, acceleration).

The origin rig (which is instantiated only once) can be instantiated at the time when a sensor first measures a component belonging to the origin rig, as described above. Alternatively, the origin rig can be instantiated at the very beginning of the construction of the temporal graph, before any measurement is made.

By proceeding in the manner described above for each measurement result of each sensor of the system, the entire temporal graph can be constructed. For example, applying the above procedure to the second system 20 in FIG. 2*c*, the temporal graph 300$_8$ in FIG. 3*c* can be constructed.

An advantage of the temporal graph is that this graph provides for a transparent and compact representation of the spatial relationships between the different components of the system as time progresses during the course of the measurements performed by the sensors in the system. Further, the temporal graph facilitates determining the optimization problem as described herein. In particular, as described in more detail below, the temporal graph facilitates determining relationships, or constraints, between the variables of the optimization problem resulting from spatial relationships between the components of the system.

While the above discussion provides for one possible procedure for constructing a temporal graph, several modifications of this procedure are possible. For example, in the above construction, the temporal graph includes one node for each measurement result, and thus the size of the temporal graph increases as the number of measurements increases. In other implementations, only some of the measurements performed by a sensor are associated with respective nodes of the temporal graph. For example, the measurement data may include data relating to a sequence of measurements $M_1, M_2, \ldots, M_n$ performed by a sensor S at times $t_1, t_2, \ldots, t_n$, respectively. A first temporal graph may be constructed by taking into account the two first measurements $M_1$ and $M_2$ according to the procedure provided above. Accordingly, in the first temporal graph, the sensor S is associated with two nodes of the temporal graph, namely a first node associated with the measurement $M_1$ and a second node associated with the measurement $M_2$. A second temporal graph can be constructed by adding a third node associated with the measurement $M_3$ performed at time $t_3$ to the first temporal graph, and by deleting the node associated with the measurement $M_1$ (and all edges connected with said node) so that only the node associated with the measurement $M_2$ and the node associated with the measurement $M_3$. are kept. Proceeding in this manner, at each time $t_i$ the temporal graph has (at most) two nodes associated with the sensor S, namely two nodes associated with the two most recent measurements $M_{i-1}$ and $M_i$. Constructing a sequence of temporal graphs in this manner keeps the size of each temporal graph in the sequence bounded, i.e. prevents the temporal graph from taking up too much memory space. Still, the advantages of the temporal graph mentioned above still apply.

The determining of an optimization problem, as described herein, may include determining a temporal graph using the processing device. Determining the temporal graph may include assigning at least one node of the temporal graph to each target object of the system (e.g. the first system or the second system as described herein). Determining the temporal graph may include assigning a plurality of nodes of the temporal graph to each sensor of the system. The plurality of nodes assigned to each sensor can include at least a first node corresponding to a first measurement performed by the sensor at a first time and a second node corresponding to a second measurement performed by the sensor at a second time.

At least one node, particularly every node, of the temporal graph can carry information relating to a movement of the system component, particularly a sensor, associated with the node. The information can relate to a speed, particularly a linear speed and/or rotational speed, of the system component. Alternatively or additionally, the information can relate to an acceleration, particularly a linear or rotational acceleration, of the system component. The speed or acceleration can be a speed or acceleration of the system component with respect to the origin rig as described herein.

A temporal graph may include a plurality of edges. Each edge between a first node and a second node of the temporal graph may represent a known or unknown spatial relationship between a first system component and a second system component of the system (e.g. the first system or the second system as described herein). The first system component is the target object or sensor of the system corresponding to the first node and the second system component is the target object or sensor of the system corresponding to the second node.

An optimization problem as described herein includes one or more variables, particularly a plurality of variables. A variable can be a probabilistic variable. A variable can be a variable representing a single number, a variable representing a vector (i.e. a vector-valued variable), a matrix-valued variable, or the like. Each unknown geometric parameter and each unknown sensor parameter of a system, e.g. the first system or the second system as described herein, are associated with one or more respective variables of the optimization problem.

An optimization problem as described herein can include one or more constraints for the variable(s) of the optimization problem.

A constraint, as described herein, can be a condition that is to be fulfilled by one or more variables.

A constraint can be a function relating two or more variables of the optimization problem to each other. For example, a system can include three components A, B and C. The coordinate transform between A and C can be known and the coordinate transforms between A and B and between B and C can be unknown. Both unknown coordinate transforms can be associated with respective variables of the optimization problem. Since the concatenation of the three coordinate transforms (i.e. from A to B, then from B to C, then from C to A) should yield the identity operation, the optimization problem includes a constraint relating the variables associated with the two unknown coordinate transforms.

Alternatively or additionally, a constraint can be a function relating a variable of the optimization problem with one or more measurement results included in the measurement data. For example, a system can include a camera and a target object observed by the camera, wherein the target object has an unknown position. If at a time t the camera takes an image of the target object, then the image provides knowledge of a 2-dimensional projection of the (three-dimensional) position of the target object at the time t. This provides a constraint on the unknown position of the target object.

A constraint, as described herein, need not take the form of an explicit condition which should be satisfied by one or more variables of the optimization problem, i.e. a "hard" constraint. Alternatively, a constraint can be a "soft" constraint. A constraint can correspond, e.g., to an additional term in an objective function of the optimization problem. For example, a constraint as described herein can be a Lagrange multiplier.

In the following, possible types of constraints are discussed.

1) A constraint can be based on a measurement model of a sensor. A measurement model is a mathematical model which can describe a relationship between the measured data and the target object which is observed by the sensor. For example, an image of a target object taken by a camera corresponds to a projection of the target object onto a 2-dimensional plane (namely the image). The measurement model of the camera can include a mathematical representation of how an object observed by the camera is mapped onto a 2-dimensional projection of the object in the image of the object taken by the camera. The 2-dimensional projection depends on the relative position and orientation of the camera with respect to the target object. Accordingly, knowledge of the image leads to a constraint on the relative position and orientation of the camera with respect to the target object, by using the measurement model of the camera.

A constraint based on a measurement model of a sensor can be a constraint for one or more variables corresponding to unknown geometric parameters, as illustrated in the example above. Additionally or alternatively, a constraint based on a measurement model can be a constraint on one or more sensor parameters. A measurement model of a sensor can include one or more sensor parameters of the sensor. For example, a lens distortion of a camera can influence the manner in which an object is mapped to its 2-dimensional projection when an image of the object is taken by the camera. Accordingly, the lens distortion can be modeled as a parameter of the measurement model of the camera. If a sensor parameter, e.g. the lens distortion, is unknown, then knowledge of the image can be used to formulate a constraint on the unknown sensor parameter, by taking into account the measurement model of the camera.

2) A constraint can be based on a motion model of a system component. A motion model can model a movement of the system component over time. For example, a camera can be fixed to a wall of a room, and an actuator may drive a left-right sweeping motion about a rotation axis of the camera, so that images of a target object in the room can be taken from different angles. A motion model for the camera can be a mathematical model of the movement (e.g. angular velocity, acceleration, and the like) of the camera as a function of time. Using the motion model, the position and/or orientation of the camera at any time can be computed. Accordingly, if an image is taken by the camera at a time t and a further image is taken at a time t', the relationship between the pose of the camera at the time t and the pose at the time t' can be computed using the motion model. Accordingly, a constraint on the relationship between the poses of the camera at the times t and t' can be determined using the motion model.

A constraint can be based on an assumption regarding the movement of a system component. For example, it may be assumed that a velocity and/or acceleration of the system component is constant. A constraint based on an assumption regarding the movement of a system component can be regarded as an example of a motion model of the system component.

3) A constraint can be based on a cycle in the temporal graph. A cycle in the temporal graph is a sequence of edges which form a closed loop, i.e. the sequence of edges starts and ends in the same node. As described herein, an edge in the temporal graph represents a spatial relationship, in particular a coordinate transform, between two system components. By concatenating all coordinate transforms along a cycle in the temporal graph, the identity operation should be obtained (since the coordinate transform from an object to itself is the identity operation). If one or more coordinate transforms along a cycle are unknown coordinate transforms, the condition that the concatenation of all coordinate transforms along the cycle should yields the identity gives rise to a constraint on the associated variables.

Accordingly, by determining all cycles in the temporal graph, the corresponding constraints can be formulated. In many cases, it is not necessary to determine all cycles, and it suffices to select a subset of cycles.

4) A constraint can be based on information regarding the shape of a target object. For example, if a sensor fusion problem involves determining the unknown shape of a target object observed by a sensor, the optimization problem can have variables associated with the unknown 3D points of the outer surface of the target object. The optimization problem can include one or more constraints which express that all 3D points of the outer surface should be points lying on an (unknown) common two-dimensional surface (e.g. a plane or more complex two-dimensional surface).

In light of the above, the optimization problem as described herein can be constructed by
(i) identifying the variable(s) of the optimization problem; this is performed by associating each unknown geometric parameter and each unknown sensor parameter with one or more variables, as described above; and
(ii) identifying one or more constraints for the variable(s), wherein each constraint can be one of the types of constraints discussed above. It is not necessary to determine all possible constraints. If a small number of constraints are included in the optimization problem, an approximate solution to the optimization problem can still be computed. As more constraints are included in the optimization problem, the solution will be more accurate.

After the optimization problem is constructed, the optimization problem can be solved. Solving the optimization problem amounts to computing numerical values for the one or more variables which, in an ideal case, satisfy the constraints exactly or, in practice, satisfy the constraints in an approximate manner within a certain permitted margin of error. For solving the optimization problem, known linear and non-linear mathematical optimization procedures can be used, e.g. gradient descent, Gauß-Newton, Levenberg-Marquardt, Conjugate gradient, and the like.

Determining an optimization problem as described herein may include determining the one or more variables of the optimization problem using the processing device.

Determining the optimization problem may include determining one or more constraints for the variables of the optimization problem using the processing device. Each constraint of the one or more constraints may be a constraint on a spatial relationship between two target objects of the system (e.g. the first system or second system as described herein), a spatial relationship between two sensors of the system, a spatial relationship between a target object and a sensor of the system, a shape of a target object of the system, a movement of a target object of the system, a movement of a sensor of the system, or a sensor parameter of a sensor of the system.

Each of the one or more constraints of the optimization problem may be a constraint based on a measurement model of a sensor of the system (e.g. the first system or the second system as described herein), a constraint based on a motion model of a sensor or target object of the system, a constraint based on a cycle of the temporal graph, or a constraint based on information regarding the shape of a target object. A measurement model of one or more sensors of the system can be made available to the processing device. A motion model of one or more sensors and/or target objects of the system can be made available to the processing device.

Determining the optimization problem may include determining one or more cycles in the temporal graph. For example, each time a rig of the temporal graph is instantiated, as described above, a search for cycles in the resulting graph may be initiated.

The temporal graph may include a first cycle, wherein the first cycle corresponds to a constraint for the variables of the optimization problem. The temporal graph may include a plurality of cycles corresponding to respective constraints for the variables of the optimization problem.

The method as described herein may include receiving, for each sensor of the first system, measurement data resulting from a plurality of measurements performed by the sensor. The method may include determining a first optimization problem using the processing device, wherein each unknown geometric parameter and each unknown sensor parameter of the first system is associated with one or more variables of the first optimization problem. The method may include determining, e.g. by the processing device, a value of each unknown geometric parameter and a value of each unknown sensor parameter of the first system by solving the first optimization problem using the processing device.

After the value of the unknown parameter(s) (i.e. unknown geometric parameters and/or unknown sensor parameters) of the first system and/or the second system have been determined by the processing device according to embodiments described herein, the determined values can be made available to an apparatus or to a plurality of apparatuses. For example, a determined value can be issued to a controller, the controller being configured to carry out a control operation in response to receiving the determined value. As another example, a determined value of a sensor parameter can be used for calibrating the sensor in question (e.g. calibration of focal length of a camera). As another example, a determined value can be issued to an actuator, which can act in response to receiving the determined value (e.g. a steering mechanism of a drone which acts in response to a 3D reconstruction of the environment). In light of the fact that embodiments described herein allow for solving a wide variety of sensor problems, many different kinds of apparatuses, to which the determined values of the sensor and/or geometric parameters can be issued, are possible.

The method according to embodiments described herein can include issuing the determined value of at least one unknown geometric or sensor parameter of the first system to at least one apparatus. The method can include issuing the determined value of at least one unknown geometric or sensor parameter of the second system to at least one apparatus.

According to a further embodiment, a data processing apparatus including a processing device is provided. The data processing apparatus may be a data processing apparatus for sensor fusion. The processing device is configured for receiving configuration data. The configuration data includes a description of a first system including one or more sensors and one or more target objects. The configuration data includes an indication that one or more geometric parameters and/or one or more sensor parameters of the first system are unknown. The processing device is configured for receiving an instruction that the received configuration data is to be adjusted into adjusted configuration data. The adjusted configuration data includes a description of a second system including one or more sensors and one or more target objects. The adjusted configuration data includes an indication that one or more geometric parameters and/or one or more sensor parameters of the second system are unknown. The processing device is configured for receiving, for each sensor of the second system, measurement data resulting from a plurality of measurements performed by the sensor. The processing device is configured for determining an optimization problem, wherein each unknown geometric parameter and each unknown sensor parameter of the second system are associated with one or more variables of the optimization problem. The processing device is configured for determining a value of each unknown geometric parameter and a value of each unknown sensor parameter of the second system by solving the optimization problem.

The data processing apparatus according to embodiments described herein may include a user interface as described herein. The user interface may be configured for allowing a user to select a first set of items, the first set of items including the one or more target objects and the one or more sensors for the first system. The user interface may be configured for allowing the user to adjust the selection of the first set of items such that the selected first set of items can be changed into a second set of items, the second set of items including the one or more target objects and the one or more sensors for the second system.

The processing device as described herein can be configured for issuing the determined value of at least one unknown geometric or sensor parameter of the first system to at least one apparatus. The processing device can be configured for issuing the determined value of at least one unknown geometric or sensor parameter of the second system to at least one apparatus.

The data processing apparatus according to embodiments described herein may be configured for carrying out any embodiment of the method described herein.

According to a further embodiment, a computer program is provided. The computer program includes instructions which, when the computer program is executed by a computer, cause the computer to provide a user interface as described herein. The user interface can be a graphic user interface. The user interface is configured for allowing a user to select a first set of items, the first set of items including one or more target objects and one or more sensors for a first system. The user interface is configured for allowing the user to indicate that one or more geometric parameters and/or one or more sensor parameters of the first system are unknown. The user interface is configured for allowing the user to adjust the selection of the first set of items such that the selected first set of items can be changed into a second set of items, the second set of items including one or more target objects and one or more sensors for a second system, wherein the second system is different from the first system. The user interface is configured for allowing the user to indicate that one or more geometric parameters and/or one or more sensor parameters of the second system are unknown. If the each of the following conditions is fulfilled:
  for each sensor of the second system, measurement data resulting from a plurality of measurements performed by the sensor is made available to the computer program, and
  the second set of items is selected via the user interface, and
  an indication that one or more geometric parameters and/or one or more sensor parameters of the second system are unknown is made via the user interface,
then the user interface allows the user to issue an instruction that causes the computer to carry out the following:
  determining an optimization problem, wherein each unknown geometric parameter and each unknown sensor parameter of the second system are associated with one or more variables of the optimization problem; and
  determining a value of each unknown geometric parameter and a value of each unknown sensor parameter of the second system by solving the optimization problem.

The user interface may be configured for allowing the user to indicate whether a spatial relationship between two target objects of the second system, between two sensors of the second system or between a target object and sensor of the second system is either a static spatial relationship or a dynamic spatial relationship.

The user interface may be configured for allowing the user to indicate that a first geometric parameter of the first system is unknown and that a second geometric parameter of the second system is unknown. The first geometric parameter may be different from the second geometric parameter. The first geometric parameter and the second geometric parameter may have different parameter types.

The user interface may be configured for allowing a user to indicate that a geometric parameter of the first system is unknown and that a sensor parameter of the second system is unknown. Additionally or alternatively, the user interface may be configured to allow a user to indicate that a sensor parameter of the first system is unknown and that a geometric parameter of the second system is unknown.

The computer program according to embodiments described herein may be configured for performing any embodiment of the method described herein.

While the foregoing is directed to embodiments of the disclosure, other and further embodiments of the disclosure may be devised without departing from the basic scope thereof, and the scope thereof is determined by the claims that follow.

The invention claimed is:

1. A method of sensor fusion for systems comprising at least one sensor and at least one target object, the method comprising:
  receiving configuration data at a processing device, the configuration data comprising:
    a description of a first system including one or more sensors and one or more target objects; and
    an indication that one or more geometric parameters and/or one or more sensor parameters of the first system are unknown;
  receiving an instruction at the processing device that the received configuration data is to be adjusted into adjusted configuration data, the adjusted configuration data comprising:
    a description of a second system including one or more sensors and one or more target objects; and
    an indication that one or more geometric parameters and/or one or more sensor parameters of the second system are unknown, wherein
    the second system is different from the first system, and/or
    the configuration data includes an indication that a first parameter is unknown, wherein the first parameter is a geometric parameter or a sensor parameter of the first system, wherein the adjusted configuration data does not include an indication that the first parameter is unknown, and/or
    the adjusted configuration data includes an indication that a second parameter is unknown, wherein the second parameter is a geometric parameter or a sensor parameter of the second system, wherein the configuration data does not include an indication that the second parameter is unknown;
  receiving, for each sensor of the second system, measurement data resulting from a plurality of measurements performed by the sensor;
  determining an optimization problem using the processing device, wherein each unknown geometric parameter and each unknown sensor parameter of the second system are associated with one or more variables of the optimization problem; and
  determining a value of each unknown geometric parameter and a value of each unknown sensor parameter of the second system by solving the optimization problem using the processing device.

2. The method according to claim 1, wherein
the second system is different from the first system, or
the configuration data includes an indication that a first parameter is unknown, wherein the first parameter is a geometric parameter or a sensor parameter of the first system, wherein the adjusted configuration data does not include an indication that the first parameter is unknown, or
the adjusted configuration data includes an indication that a second parameter is unknown, wherein the second parameter is a geometric parameter or a sensor parameter of the second system, wherein the configuration data does not include an indication that the second parameter is unknown.

3. The method according to claim 1, wherein the configuration data and the instruction are both received from a same user interface,
wherein the user interface is configured for allowing a user to select a first set of items, the first set of items including the one or more target objects and the one or more sensors for the first system,
wherein the user interface is further configured for allowing the user to adjust the selection of the first set of items such that the selected first set of items can be changed into a second set of items, the second set of items including the one or more target objects and the one or more sensors for the second system.

4. The method according to claim 3, wherein the same user interface is a same graphic user interface.

5. The method according to claim 1, wherein each geometric parameter of the second system is a parameter associated with one of:
a shape of a target object of the second system, or of a portion thereof;
a spatial relationship, between two target objects of the second system, between two sensors of the second system or between a sensor and a target object of the second system; and
a movement of a sensor of the second system.

6. The method according to claim 5, wherein the spatial relationship is a coordinate transform.

7. The method according to claim 1, wherein the configuration data includes an indication that a first geometric parameter of the first system is unknown and the adjusted configuration data includes an indication that a second geometric parameter of the second system is unknown, wherein the first geometric parameter is different from the second geometric parameter.

8. The method according to claim 7, wherein the adjusted configuration data does not include an indication that the first geometric parameter is unknown and/or wherein the configuration data does not include an indication that the second geometric parameter is unknown.

9. The method according to claim 7, wherein the first geometric parameter and the second geometric parameter have different parameter types,
wherein the parameter type of a geometric parameter indicates whether the geometric parameter is associated with:
a position of a target object; or
a spatial orientation of a target object; or
a shape of a target object; or
a movement of a sensor or a target object; or
a spatial relationship between two target objects; or
a spatial relationship between two sensors; or
a spatial relationship between a sensor and a target object.

10. The method according to claim 1, wherein
the configuration data includes an indication that a geometric parameter of the first system is unknown and the adjusted configuration data includes an indication that a sensor parameter of the second system is unknown, or
the configuration data includes an indication that a sensor parameter of the first system is unknown and the adjusted configuration data includes an indication that a geometric parameter of the second system is unknown.

11. The method according to claim 1, wherein the adjusted configuration data further includes:
an indication that a spatial relationship between two target objects of the second system, between two sensors of the second system or between a target object and sensor of the second system is a static spatial relationship, or
an indication that a spatial relationship between two target objects of the second system, between two sensors of the second system or between a target object and sensor of the second system is a dynamic spatial relationship.

12. The method according to claim 1, wherein determining the optimization problem includes determining one or more constraints for the variables of the optimization problem using the processing device,
wherein each constraint of the one or more constraints may be a constraint on a spatial relationship between two target objects of the second system, a constraint on a spatial relationship between two sensors of the second system, a constraint on a spatial relationship between a target object and a sensor of the second system, a constraint on a shape of a target object of the second system, a constraint on a movement of a target object of the second system, a constraint on a movement of a sensor of the second system, or a constraint on a sensor parameter of a sensor of the second system.

13. The method according to claim 1, wherein the determining of the optimization problem comprises determining a temporal graph using the processing device, wherein the determining of the temporal graph comprises:
assigning at least one node of the temporal graph to each target object of the second system; and
assigning a plurality of nodes of the temporal graph to each sensor of the second system, wherein the plurality of nodes assigned to each sensor includes at least a first node corresponding to a first measurement performed by the sensor at a first time and a second node corresponding to a second measurement performed by the sensor at a second time,
wherein the temporal graph includes a plurality of edges, wherein each edge between a first node and a second node of the temporal graph represents a known or unknown spatial relationship between a first system component and a second system component of the second system, wherein the first system component is the target object or sensor of the second system corresponding to the first node and the second system component is the target object or sensor of the second system corresponding to the second node.

14. The method according to claim 13, wherein the temporal graph includes a first cycle, wherein the first cycle corresponds to a constraint for the variables of the optimization problem.

15. A data processing apparatus comprising a processing device configured for carrying out the following:
receiving configuration data, the configuration data comprising:

a description of a first system including one or more sensors and one or more target objects; and
an indication that one or more geometric parameters and/or one or more sensor parameters of the first system are unknown;
receiving an instruction that the received configuration data is to be adjusted into adjusted configuration data, the adjusted configuration data comprising:
a description of a second system including one or more sensors and one or more target objects; and
an indication that one or more geometric parameters and/or one or more sensor parameters of the second system are unknown,. wherein
the second system is different from the first system, and/or
the configuration data includes an indication that a first parameter is unknown, wherein the first parameter is a geometric parameter or a sensor parameter of the first system, wherein the adjusted configuration data does not include an indication that the first parameter is unknown, and/or
the adjusted configuration data includes an indication that a second parameter is unknown, wherein the second parameter is a geometric parameter or a sensor parameter of the second system, wherein the configuration data does not include an indication that the second parameter is unknown;
receiving, for each sensor of the second system, measurement data resulting from a plurality of measurements performed by the sensor;
determining an optimization problem, wherein each unknown geometric parameter and each unknown sensor parameter of the second system are associated with one or more variables of the optimization problem; and
determining a value of each unknown geometric parameter and a value of each unknown sensor parameter of the second system by solving the optimization problem.

16. The data processing apparatus according to claim 15, further comprising a user interface configured for allowing a user to select a first set of items, the first set of items including the one or more target objects and the one or more sensors for the first system,
wherein the user interface is further configured for allowing the user to adjust the selection of the first set of items such that the selected first set of items can be changed into a second set of items, the second set of items including the one or more target objects and the one or more sensors for the second system.

17. A computer program comprising instructions which, when the computer program is executed by a computer, cause the computer to provide a user interface, wherein the user interface is configured for:

allowing a user to select a first set of items, the first set of items including one or more target objects and one or more sensors for a first system;
allowing the user to indicate that one or more geometric parameters and/or one or more sensor parameters of the first system are unknown;
allowing the user to adjust the selection of the first set of items such that the selected first set of items can be changed into a second set of items, the second set of items including one or more target objects and one or more sensors for a second system; and
allowing a user to adjust the indication that the one or more geometric parameters and/or the one or more sensor parameters of the first system are unknown into an indication that one or more geometric parameters and/or one or more sensor parameters of the second system are unknown; wherein:
if, for each sensor of the second system, measurement data resulting from a plurality of measurements performed by the sensor is made available to the computer program, and
if the second set of items is selected via the user interface, and
if an indication that one or more geometric parameters and/or one or more sensor parameters of the second system are unknown is made via the user interface,
then the user interface allows the user to issue an instruction that causes the computer to carry out the following:
determining an optimization problem, wherein each unknown geometric parameter and each unknown sensor parameter of the second system are associated with one or more variables of the optimization problem; and
determining a value of each unknown geometric parameter and a value of each unknown sensor parameter of the second system by solving the optimization problem.

18. The computer program of claim 17, wherein the user interface is configured for allowing a user to adjust the indication that the one or more geometric parameters and/or the one or more sensor parameters of the first system are unknown into an indication that one or more geometric parameters and/or one or more sensor parameters of the second system are unknown.

19. The computer program of claim 17, wherein the user interface is further configured for allowing the user to indicate whether a spatial relationship between two target objects of the second system, between two sensors of the second system or between a target object and sensor of the second system is either a static spatial relationship or a dynamic spatial relationship.

20. A computer-readable data carrier having stored thereon the computer program according to claim 17.

* * * * *